US012654040B2

(12) United States Patent
    Aleksovski

(10) Patent No.: US 12,654,040 B2
(45) Date of Patent: Jun. 16, 2026

(54) CABLE GRAB

(71) Applicant: WERNER CO., Itasca, IL (US)

(72) Inventor: Daniel Aleksovski, Irondale, AL (US)

(73) Assignee: WERNER CO., Itasca, IL (US)

( * ) Notice: Subject to any disclaimer, the term of this patent is extended or adjusted under 35 U.S.C. 154(b) by 388 days.

(21) Appl. No.: 18/124,313

(22) Filed: Mar. 21, 2023

(65) Prior Publication Data

US 2023/0405365 A1     Dec. 21, 2023

Related U.S. Application Data

(60) Provisional application No. 63/353,120, filed on Jun. 17, 2022.

(51) Int. Cl.
    *A62B 35/00*     (2006.01)
    *A62B 1/14*      (2006.01)
    *F16B 2/18*      (2006.01)

(52) U.S. Cl.
    CPC ................. *A62B 1/14* (2013.01); *F16B 2/185* (2013.01)

(58) Field of Classification Search
    CPC ....... A62B 1/14; A62B 35/0081; A62B 35/04; F16B 2/185
    See application file for complete search history.

(56) References Cited

U.S. PATENT DOCUMENTS

| | | |
|---|---|---|
| 4,846,075 A | 7/1989 | Tupper |
| 5,598,900 A | 2/1997 | O'Rourke |

| | | |
|---|---|---|
| 9,636,528 B2 | 5/2017 | Casebolt et al. |
| 11,642,554 B2 * | 5/2023 | Sulc ................... A62B 35/0081 188/65.1 |
| 2002/0014370 A1 * | 2/2002 | Casebolt .................. A62B 1/14 182/8 |
| 2014/0020988 A1 | 1/2014 | Casebolt et al. |
| 2016/0130875 A1 | 5/2016 | Hwang et al. |
| 2016/0332007 A1 | 11/2016 | Renton et al. |
| 2017/0113072 A1 * | 4/2017 | Sepe ..................... F16D 63/008 |
| 2021/0128955 A1 | 5/2021 | Marak et al. |
| 2021/0220680 A1 | 7/2021 | Novotny et al. |

FOREIGN PATENT DOCUMENTS

| | | |
|---|---|---|
| EP | 2687268 A2 | 1/2014 |
| WO | 2009/037173 A1 | 3/2009 |

OTHER PUBLICATIONS

USPTO, "International Search Report and Written Opinion" for corresponding International (PCT) Patent Application No. PCT/US2023/023047, dated Oct. 6, 2023, 12 pp.
European Patent Office Extended Search Report for Application No. 23824394.3 dated Apr. 22, 2026 (13 pages).
Taiwan Patent Office Action for Application No. 112119908 dated Apr. 28, 2026 (14 pages including machine English translation).

* cited by examiner

*Primary Examiner* — Amy J. Sterling
(74) *Attorney, Agent, or Firm* — Michael Best & Friedrich LLP

(57)     ABSTRACT

A cable grab for a fall protection system includes a channel for receiving a safety wire, a cam structured to grab the safety wire in the event of a fall, a lever structured to rotate and cause the cam to grab the safety wire in the event of a fall, and an energy absorber having a working length, a normal webbing portion, and a connection point, wherein the working length or the normal webbing portion are structured to engage the lever in the event of a fall.

20 Claims, 10 Drawing Sheets

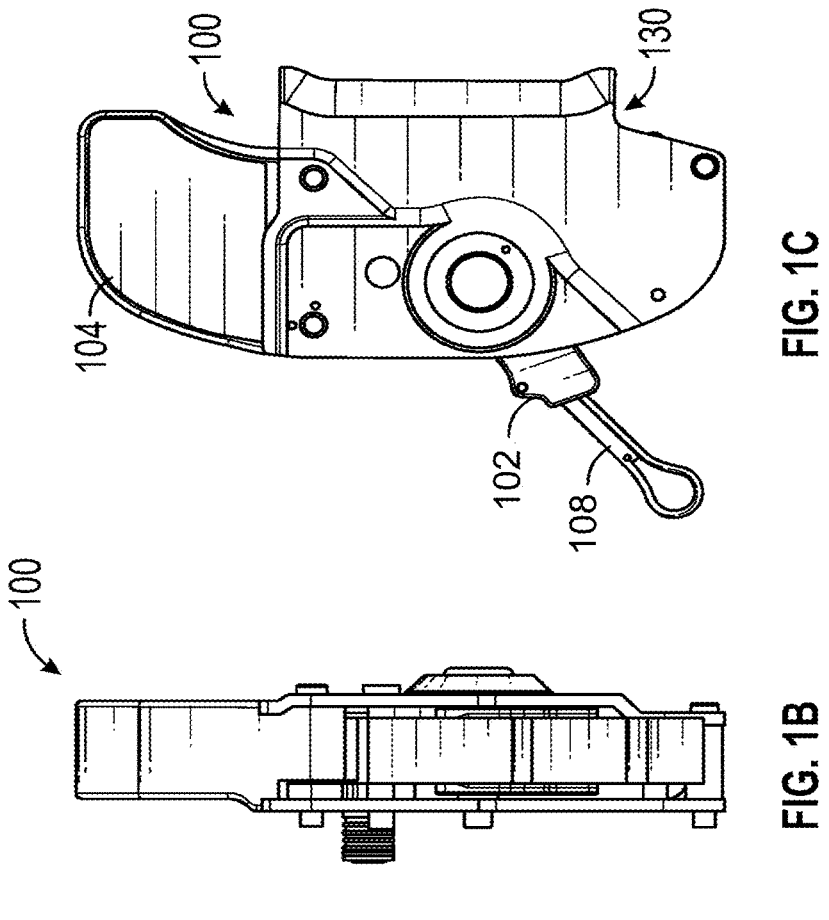
FIG. 1C
FIG. 1B
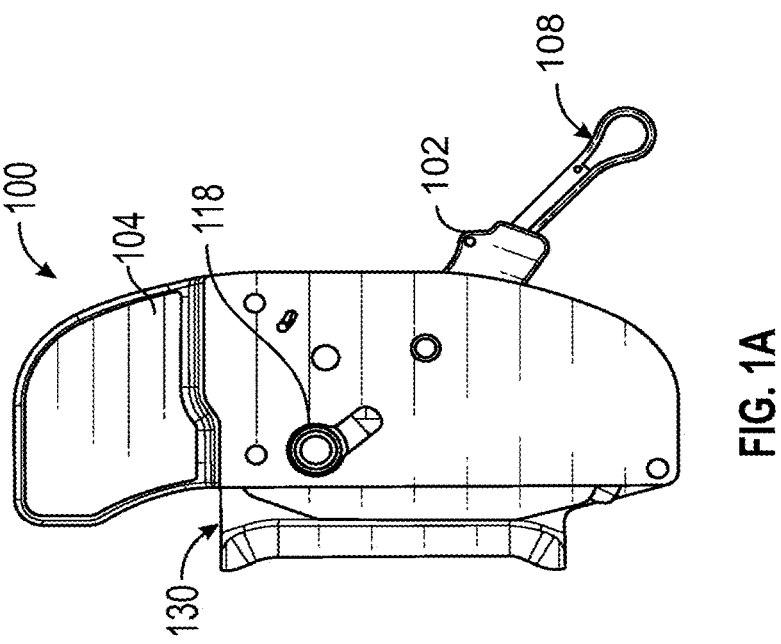
FIG. 1A

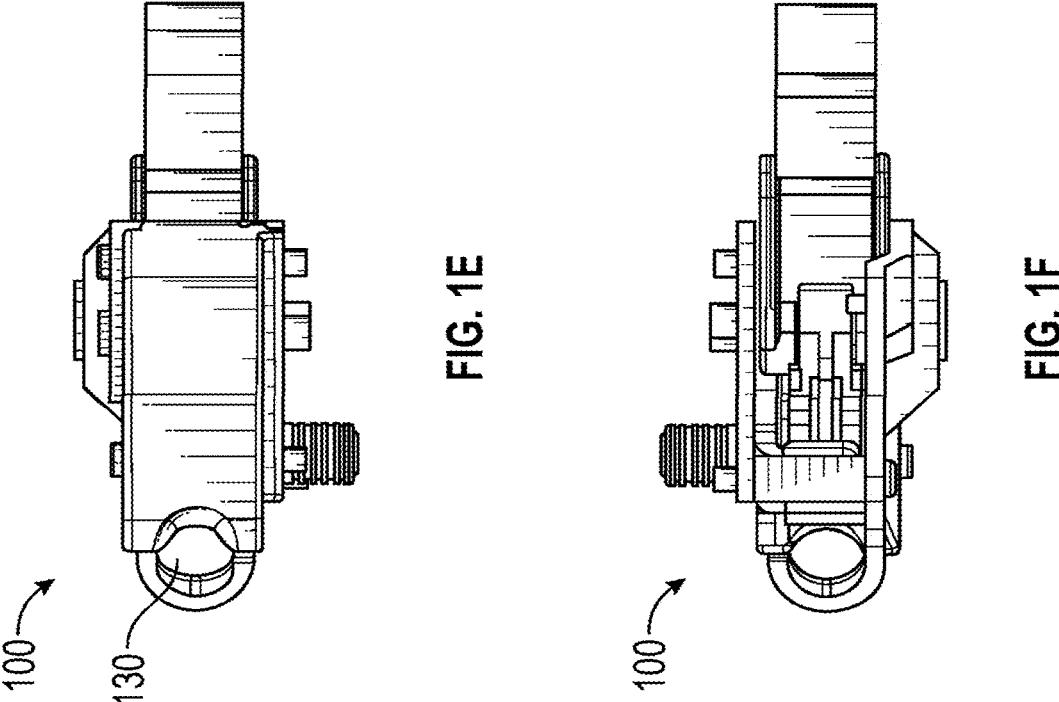
FIG. 1E
FIG. 1F
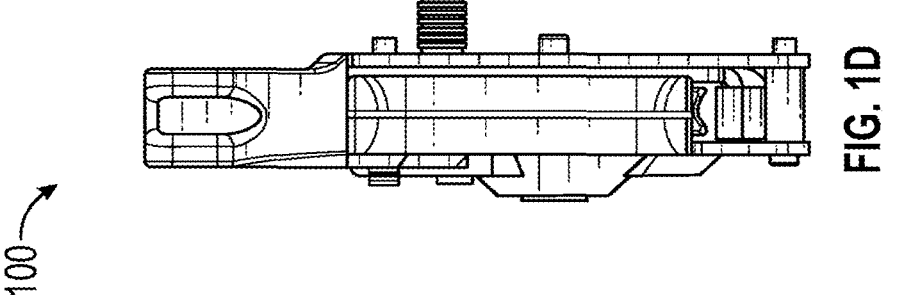
FIG. 1D

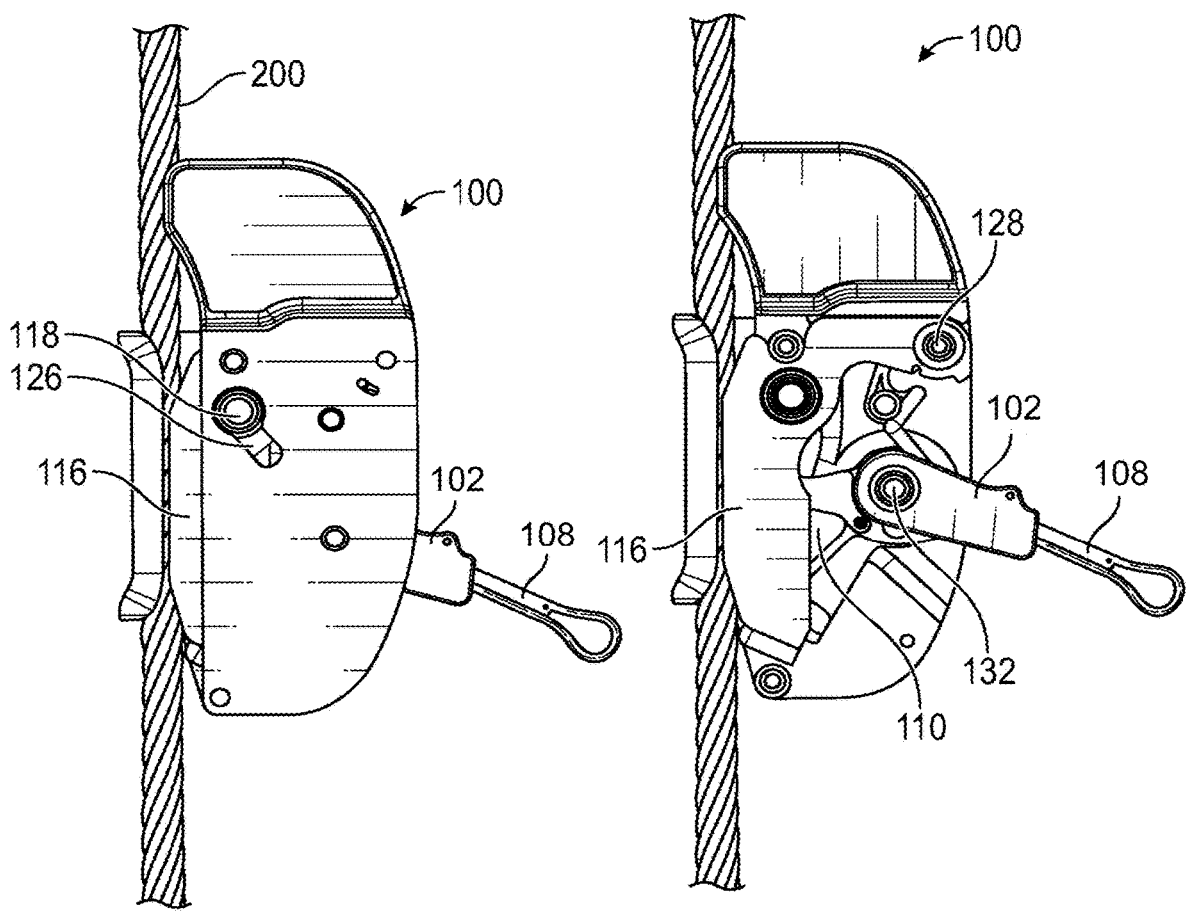
FIG. 5                    FIG. 6

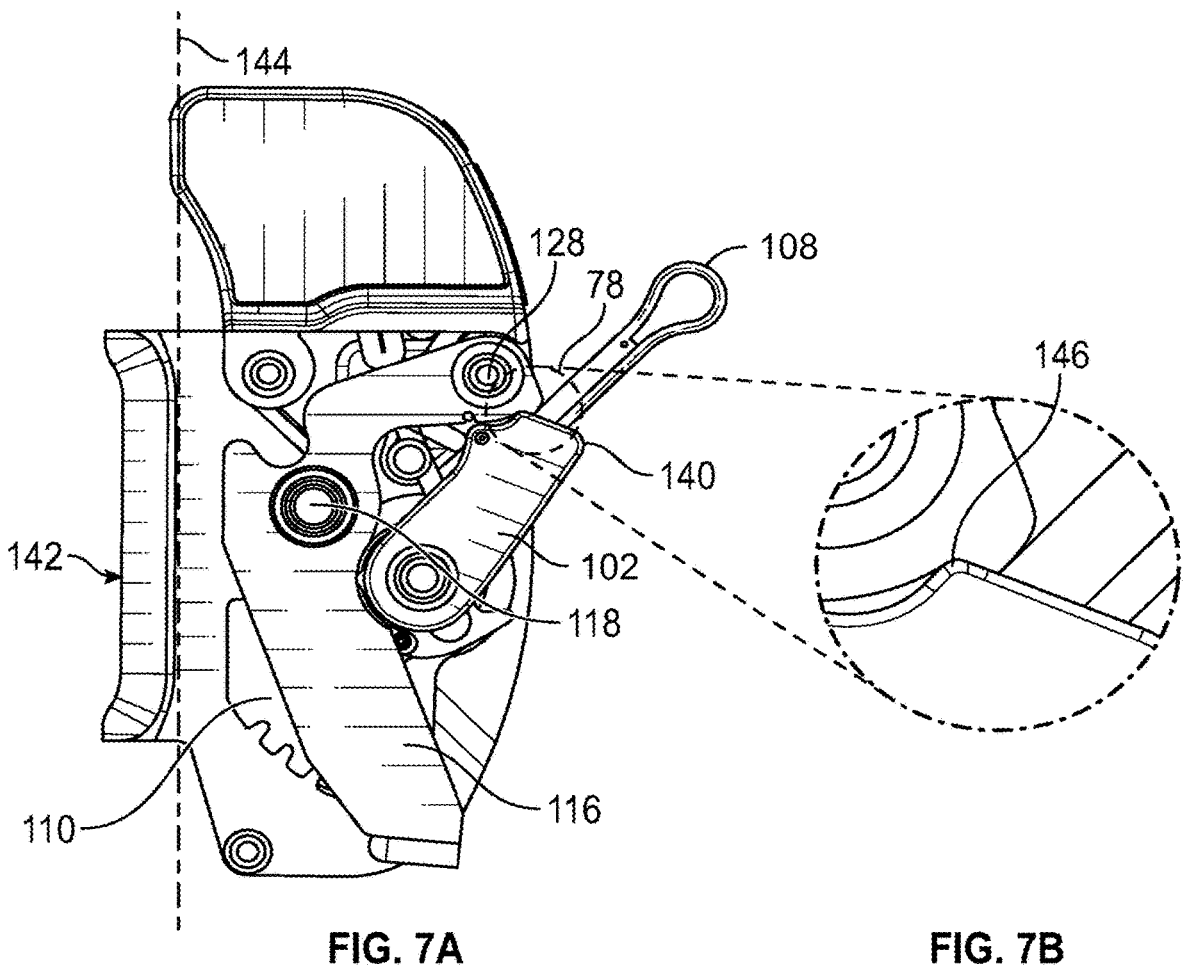
FIG. 7A                    FIG. 7B

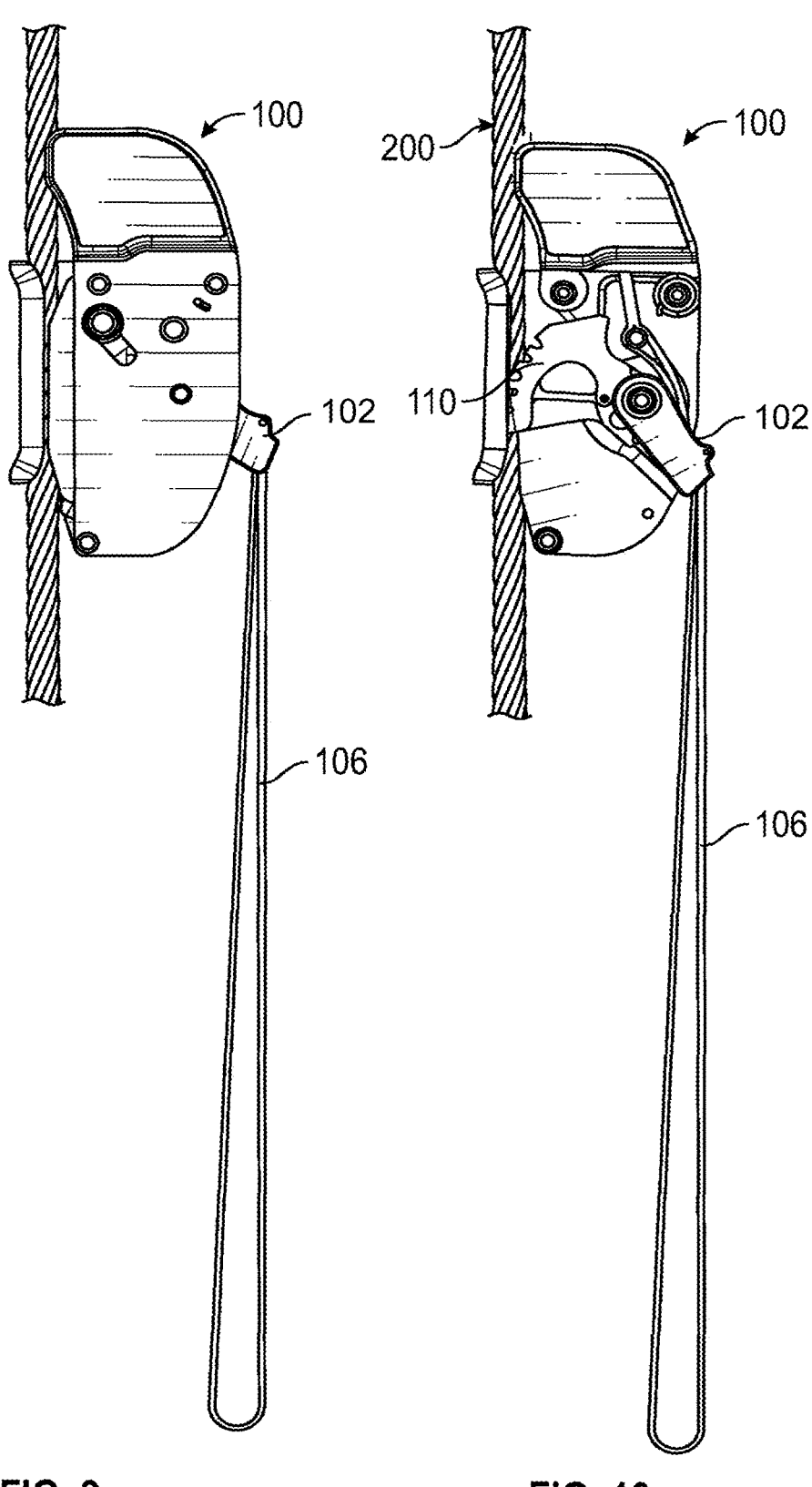
FIG. 9          FIG. 10

CABLE GRAB

CROSS REFERENCE TO RELATED APPLICATION

This application claims the benefit of U.S. Provisional Patent Application Ser. No. 63/353,120, filed Jun. 17, 2022, which is incorporated by reference herein.

BACKGROUND

Field

The disclosed concept relates generally to fall protection systems, and in particular, to a cable grab for use in fall protection systems.

Background Information

Some ladder systems use a wire rope safety line. A fall arrest device is attached to the wire rope safety line and couples to a user's safety harness. The fall arrest device is designed to use a lever arm to engage a cam that grips the wire rope to arrest a fall. The lever arm is directly linked through a chain of load bearing components to the user's harness. The external load bearing components extend the fall distance before arrest and stress the lever arm. There remains room for improvement in fall arrest devices for use with a wire rope safety line.

SUMMARY OF THE INVENTION

In accordance with an aspect of the disclosed concept, a cable grab for a fall protection system comprises: a channel for receiving a safety wire; a cam structured to grab the safety wire in the event of a fall; a lever structured to rotate and cause the cam to grab the safety wire in the event of a fall; and an energy absorber having a working length, a normal webbing portion, and a connection point, wherein the working length or the normal webbing portion are structured to engage the lever in the event of a fall.

In accordance with another aspect of the disclosed concept, a cable grab for a fall protection system comprises: a channel for receiving a safety wire; a channel cover having an unlocked position to provide access to the channel and a locked position to prevent access to the channel; a safety pull structured to lock the channel cover in the locked position, wherein the safety pull is structured to be pulled to unlock the channel cover and move the channel cover to the unlocked position; and a lever structured to rotate and abut against the channel cover spring when the channel cover spring is unlocked to move the channel cover spring to the unlocked position.

In accordance with another aspect of the disclosed concept, a cable grab for a fall protection system comprises: a channel for receiving a safety wire; a cam structured to grab the safety wire in the event of a fall; a lever structured to rotate in a clockwise direction independent of the cam across a first range of rotation and is structured to rotate further in the clockwise direction across a subsequent second range of rotation and cause the cam to rotate and grab the safety wire; and webbing passing through the lever and configured to attach to a harness, wherein the webbing is structured to cause the lever to rotate in the clockwise direction in the event of a fall.

BRIEF DESCRIPTION OF THE DRAWINGS

A full understanding of the disclosed concept can be gained from the following description of the preferred embodiments when read in conjunction with the accompanying drawings in which:

FIG. 1A is a front view of a cable grab in accordance with an example embodiment of the disclosed concept;

FIG. 1B is a right side view of the cable grab of FIG. 1A;

FIG. 1C is a back view of the cable grab of FIG. 1A;

FIG. 1D is a left side view of the cable grab of FIG. 1A;

FIG. 1E is a top view of the cable grab of FIG. 1A;

FIG. 1F is a bottom view of the cable grab of FIG. 1A;

FIG. 5 is a view of a cable grab in a rest position attached to a safety wire in accordance with an example embodiment of the disclosed concept;

FIG. 6 is a view of the cable grab of FIG. 5 with a cover removed;

FIG. 7A is a view of a cable grab with a channel cover in the open position in accordance with an example embodiment of the disclosed concept;

FIG. 7B is a detail view of the cable grab of FIG. 7A;

FIG. 9 is a view of a cable grab after a fall arrest in accordance with an example embodiment of the disclosed concept;

FIG. 10 is a view of the cable grab of FIG. 9 with a cover removed;

DESCRIPTION OF THE PREFERRED EMBODIMENTS

Figure 3:
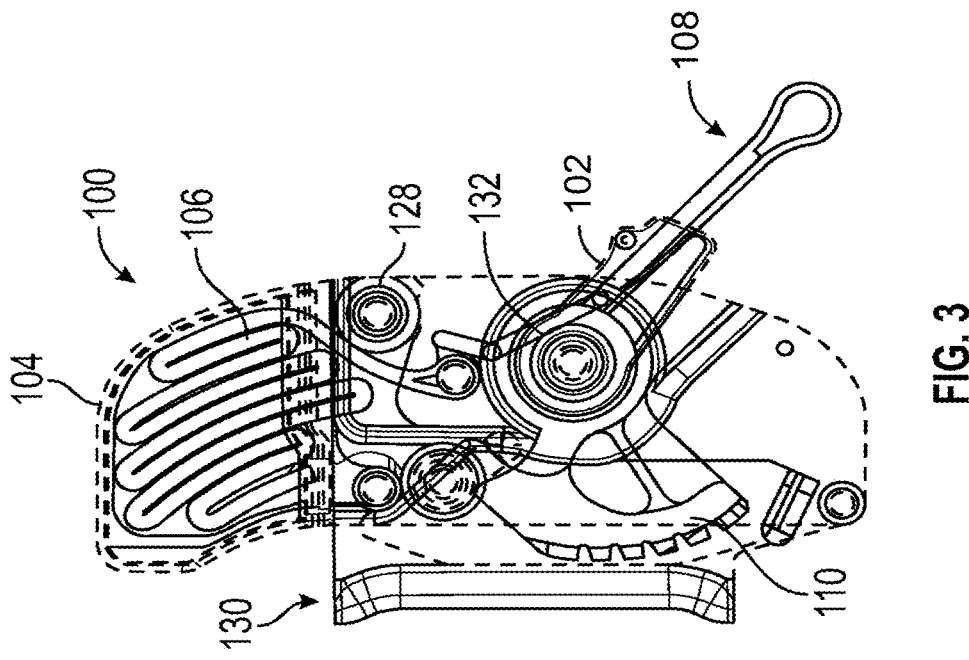
FIG. 3 is a wireframe view of a cable grab in a rest position in accordance with an example embodiment of the disclosed concept.
Figure 2:
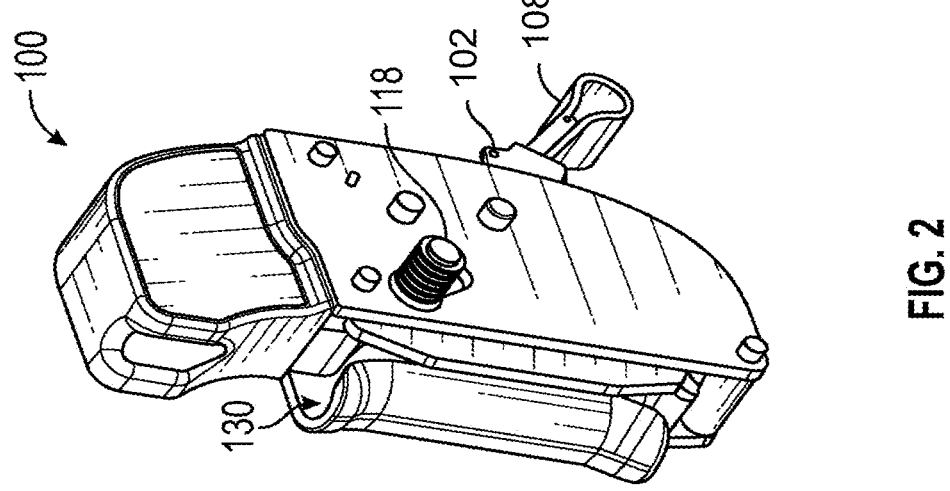
FIG. 2 is a perspective view of a cable grab in a rest position in accordance with an example embodiment of the disclosed concept.
Figure 4:
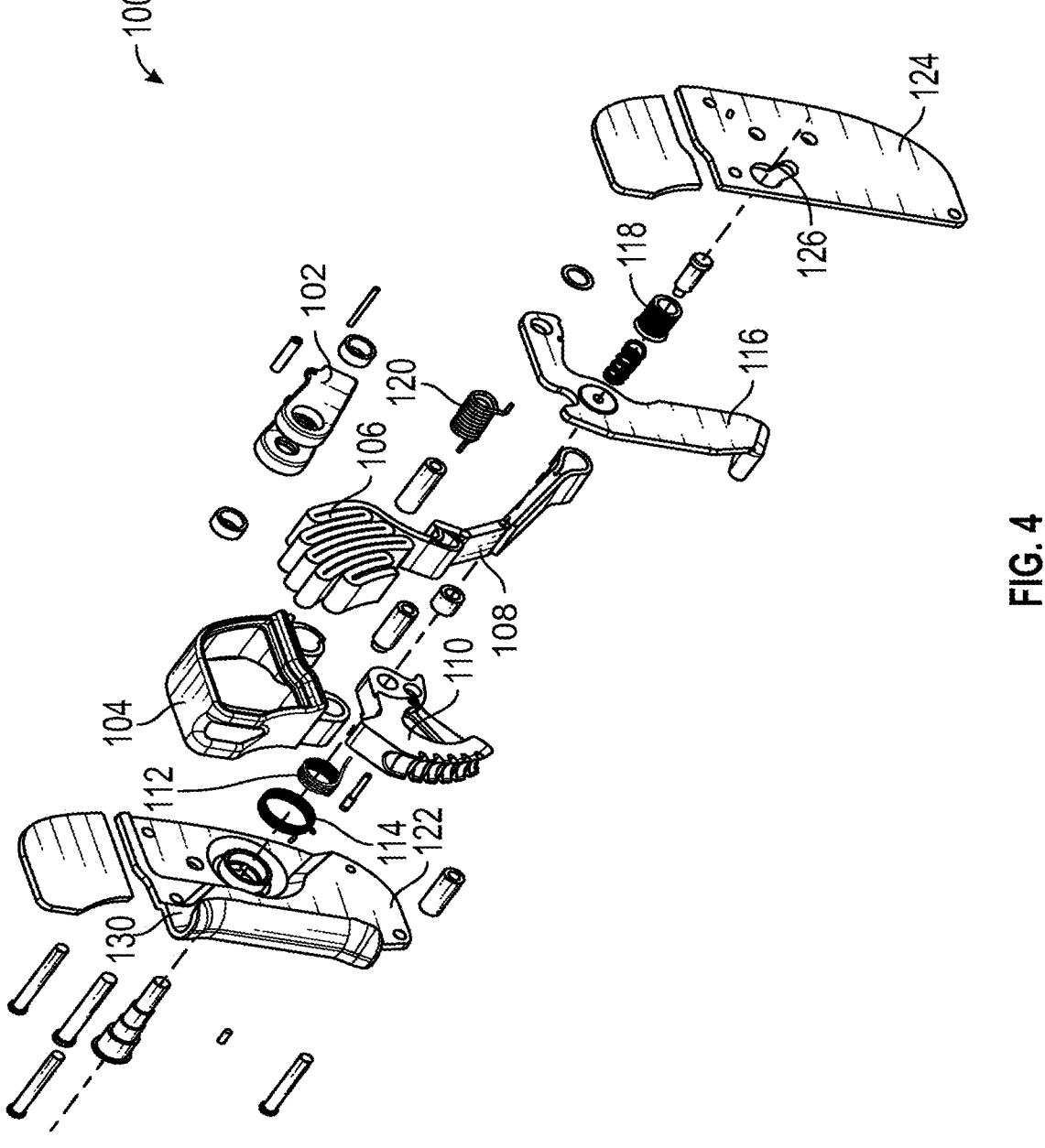
FIG. 4 is an exploded view of a cable grab in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIGS. 1-4 illustrate various views of a cable grab 100 in accordance with an example embodiment of the disclosed concept. FIGS. 5-10 illustrate the cable grab 100 of FIGS. 1-4 in various states of use.

In accordance with example embodiments of the disclosed concept, a cable grab 100 is configured to be used to attach to a safety wire 200 (shown for example in FIG. 5) and arrest a fall by grabbing the safety wire 200 in the case of a fall. The cable grab 100 includes a channel 130 configured to receive the safety wire 200. A portion of webbing 108 extends from the cable grab 100 and serves to connect to a user's safety harness via intermediate components, such as a carabiner.

The cable grab 100 includes a wire guide housing 104, within which is disposed folded up energy absorber webbing 106. The end of the webbing is routed through a lever 102 to a point external to the cable grab 100 and is configured to be used to connect to the user's harness via intermediate components. The lever 102 shares a pivot point 132 with a cam 110. A cam spring 114 exerts a clockwise torque on the cam 110, which partially offsets the cam's 110 weight. In the case of a fall, the cam spring 114 will force the cam 110 to engage the safety wire and arrest the fall. The lever 102 provides a secondary mechanism for arresting a fall. The lever 102 and the cam 110 rotate independent of each other, except when the lever 102 is in the extreme clockwise position they rotate together. A lever spring 112 biases the lever 102 to the extreme clockwise position. The spring force is chosen to be strong enough to cause the lever 102, and thus also the cam 110, to rotate such that the cam 110 engages the safety wire 200 if the cable grab 100 is at rest. The spring force is also weak enough that when holding the weight of the cable grab 100 by the end of the lever 102 (e.g., at the connection point) the force on the lever 102 will counteract the spring force and cause the lever 102 to rotate counterclockwise, thus causing the cam 110 to disengage the safety wire 200. In the case of a fall, the forces from the fall will act to drive the cam 110 further into the safety wire 200 and provide a stronger grip on the safety wire 200. Furthermore, in the case of a fall, the energy absorber 106 will deploy and the folded webbing internal to the cable grab 100 will pass through the lever 102, thus absorbing fall forces. An example of the cable grab 100 with the energy absorber 106 deployed after a fall is shown in FIGS. 9 and 10.

In some example embodiments, the energy absorber 106 includes a working length, a normal webbing portion, and a connection point. The working length is the portion that tears controllably in a fall event. The normal webbing portion is disposed between the working length and the connection point and does not tear in a fall event. The connection point is configured to allow connection to a device such as a carabiner. The majority of the working length of the energy absorber 106 remains stationary relative to the housing in normal use. In some example embodiments, the working length of the energy absorber 106 is within the wire guide housing 104. However, in some example embodiments, the working length may be external to the wire guide housing 104, such as fixed above or on the outside of the wire guide housing 104. The energy absorber 106 is structured such that the working length and/or normal webbing portion engage the lever 102 in the case of a fall event, for example to pull the lever 102 downward. In some example embodiments, a portion of the energy absorber 106 (e.g., the normal webbing portion) passes through the lever 102 such that in a fall event the energy absorber 106 will engage with the lever and pull it downward. However, it will be appreciated that other arrangements where the working length and/or normal webbing portion of the energy absorber 106 engage the lever without departing from the scope of the disclosed concept.

The cable grab 100 further includes a channel cover 116 that prevents the cable grab 100 from separating from the safety wire 200 by blocking the safety wire 200 from being removed from the channel 130 of the cable grab 100. An example of the channel cover 116 in its in-use position blocking the safety wire 200 is shown in FIGS. 5 and 6.

To release the cable grab 100 from the safety wire 200, the channel cover 116 must be unlocked and rotated such that it no longer blocks the safety wire 200 from being removed from the channel 130. A safety pull 118 is included in the cable grab 100 to facilitate easy unlocking of the channel cover 116. The safety pull 118 is spring loaded and extends through a cover 124 of the housing and the channel cover 116 into an opposite cover 122 of the housing. Pulling the safety pull 118 disengages the safety pull 118 from the opposite cover 122 of the housing and allows the channel cover 116 to rotate to an unlocked position where it does not block the channel 130, as is shown in FIG. 7. After the user pulls the safety pull 118, the user presses upward on the lever 102, which abuts against a notch 146 (shown in FIG. 7B) in the channel cover 116 to rotate the channel cover 116 to the unlocked position. By pressing a thumb (at a thumb pressing point 140) on the lever 102 and fingers (at a finger pressing area 142) on the opposite side of the cable grab 100, the user is able to maintain the channel cover 116 in the unlocked position with one hand. The other hand can be used to insert or remove the safety wire 200 from the channel 130. The notch 146 on the channel cover 116 is structured to receive an end of the lever 102 and assist in maintaining the channel cover 116 in the unlocked position. The cable grab 100 further includes a channel cover spring 120 structured to bias the channel cover to the locked position where it blocks the channel 130. Once the safety wire 200 is placed in the channel 130, or removed from the channel 130, the user can release the lever 102 and the channel cover spring 120 will cause the channel cover 116 to revert to the locked position.

Figure 8:
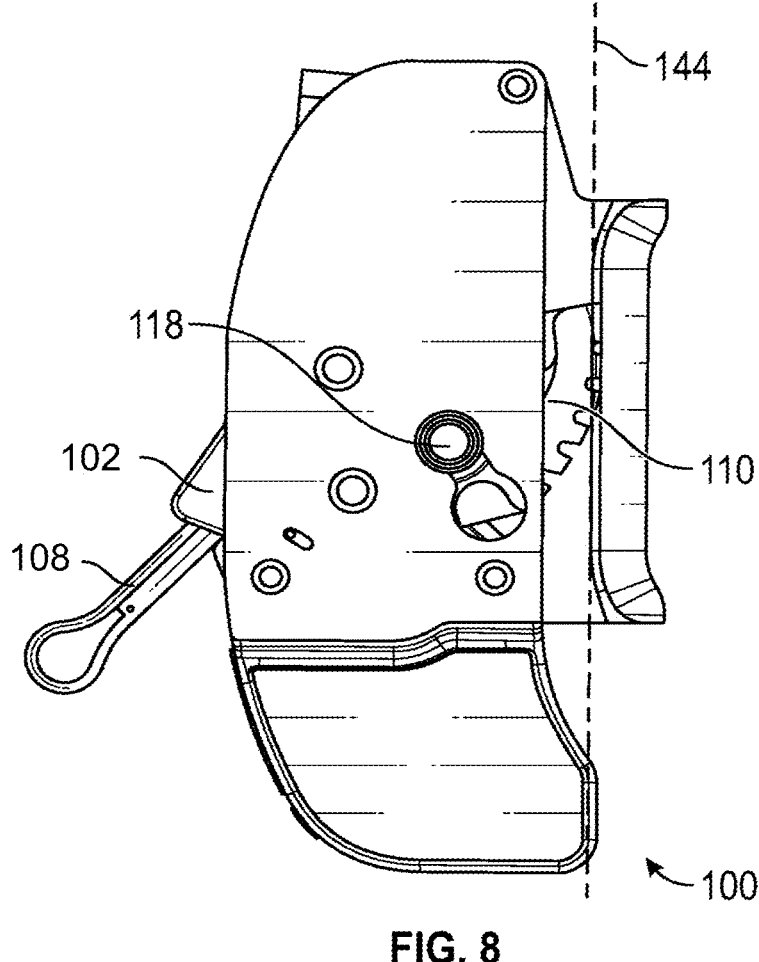
FIG. 8 is a view of a cable grab incorrectly oriented with respect to a safety wire in accordance with an example embodiment of the disclosed concept.

FIG. 8 shows a view of an attempt to attach the cable grab 100 to the safety wire 200 in an inverted position where the bottom of the cable grab is above the top of the cable grab 100. Attaching the cable grab 100 in this manner would be problematic because the lever 102 and cam 110 are structured to arrest a fall based on downward force. The cable grab 100 prevents attachment to the safety wire 200 in this orientation because although the channel cover 116 is rotated to the unlocked position, due to the cable grab 100 being inverted, the cam 110 has rotated to a position where it blocks the safety wire 200 from being inserted into the channel 130.

The cable grab 100 in accordance with example embodiments of the disclosed concept provides several advantages. The energy absorber 106 is separate from the lever 102 which allows more design freedom for energy absorber 106 size and location. The energy absorber 106 is also located internal to the cable grab 100, which keeps the energy absorber 106 protected and out of the way. The energy absorber 106 may be woven, which makes it simpler to increase the user weight limit. Additionally, separating the energy absorber 106 from the lever 102 allows the distance between the user attachment and the device to be shorter, which can reduce the fall distance. Furthermore, since arresting forces are not directly applied to the lever 102, the lever 102 need not be as strong. As additionally described above, the channel cover 116 is simple to lock and unlock for attachment or detachment to the safety wire 200 and the cable grab 100 is prevented from being attached to the safety wire in an inverted orientation.

Figure 11:
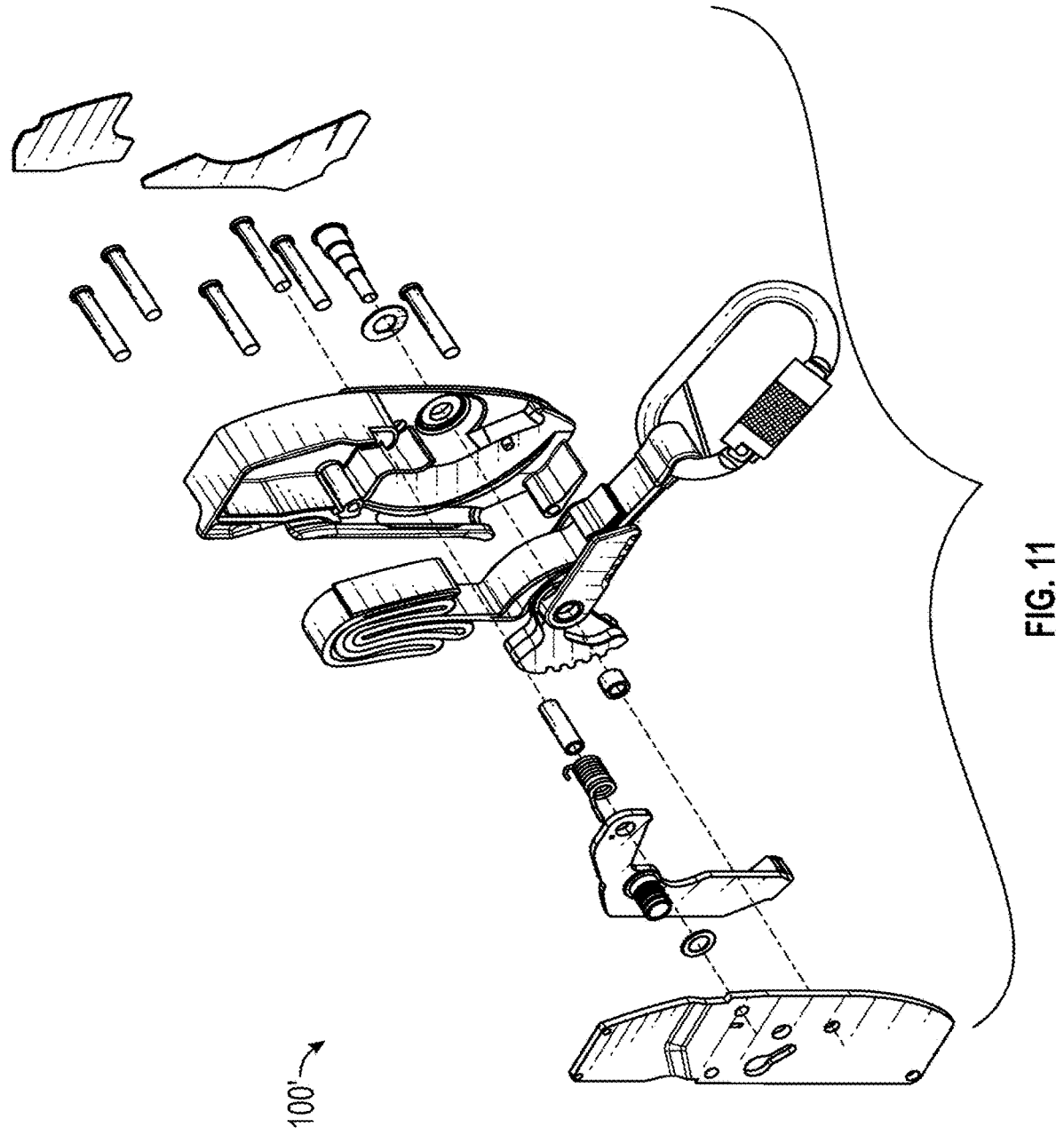
FIG. 11 is an exploded view of a cable grab in accordance with an example embodiment of the disclosed concept.
Figure 13:
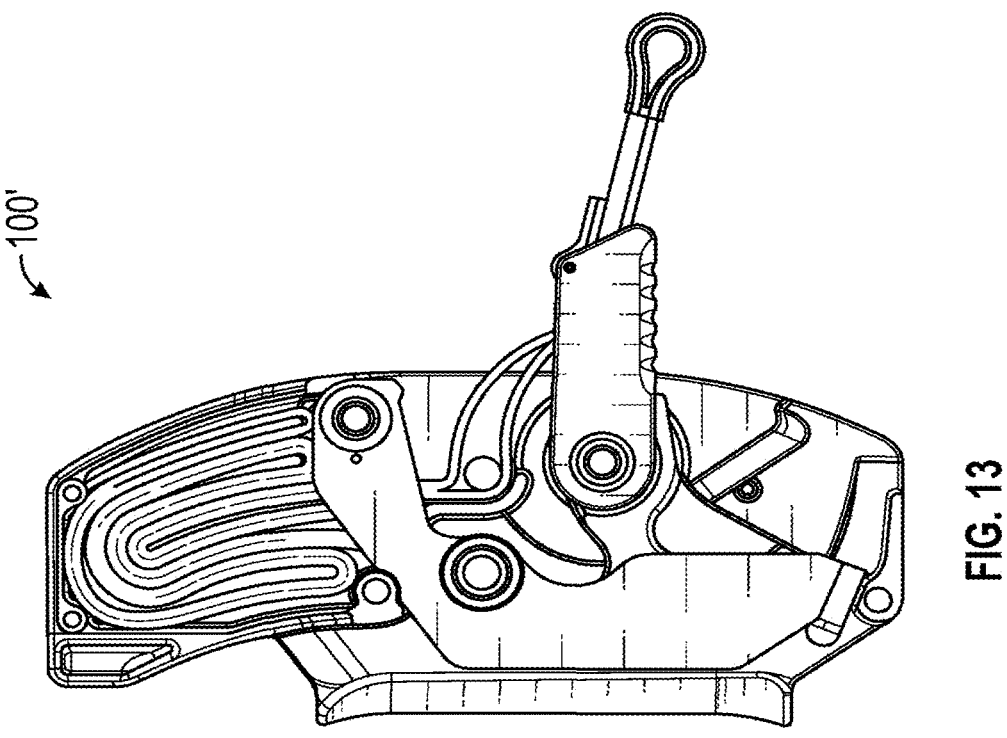
FIG. 13 is a front view of the cable grab of FIG. 12 with the cover removed.
Figure 12:
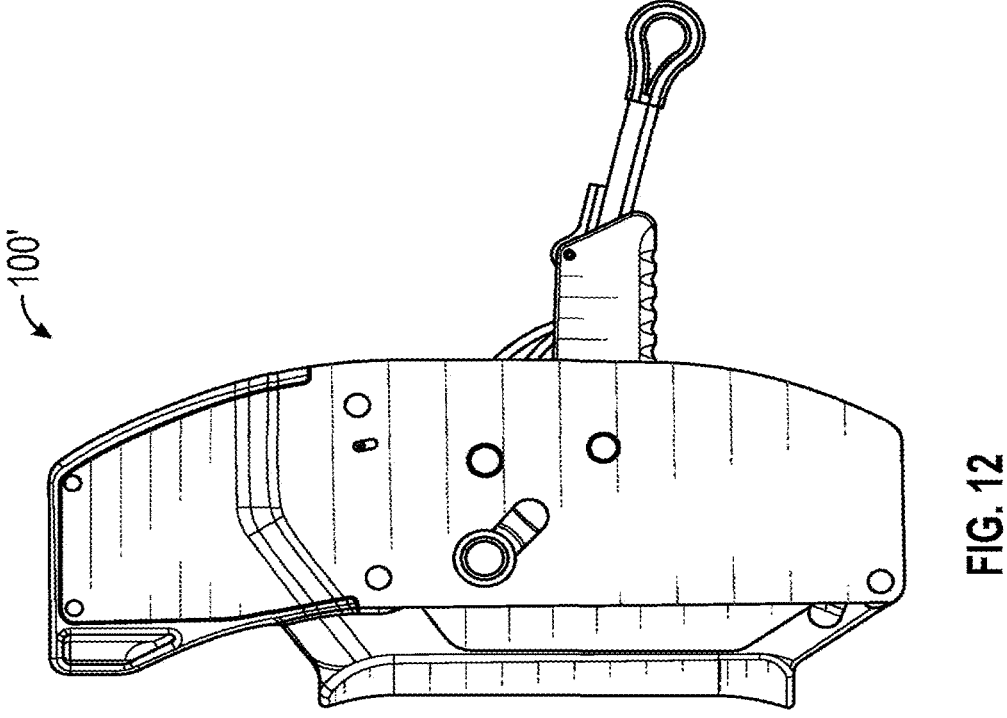
FIG. 12 is a front view of a cable grab in accordance with an example embodiment of the disclosed concept.

It will be appreciated that various modifications may be made without departing from the scope of the disclosed concept. For example, various parts of the housing of the cable grab 100 may be, such as for example, varying the shape and size, or by combining or dividing one or more separate parts. For example, FIGS. 11-13 include illustrations of an alternative cable grab 100' in which the wire guide housing and part of the cover of the housing of the cable grab 100' are combined into a single part. It will be appreciated that other such modification may be made without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A cable grab for a fall protection system comprises:
a channel for receiving a safety wire;
a cam structured to grab the safety wire in the event of a fall;
a lever structured to rotate and cause the cam to grab the safety wire in the event of a fall; and
an energy absorber having a working length, a normal webbing portion, and a connection point, wherein the working length or the normal webbing portion are structured to engage the lever in the event of a fall.

2. The cable grab of claim 1, further comprising:
a channel cover having an unlocked position to provide access to the channel and a locked position to prevent access to the channel.

3. The cable grab of claim 1, further comprising:
a channel cover spring structured to bias the channel cover to the locked position.

4. The cable grab of claim 2, further comprising:
a safety pull structured to lock the channel cover in the locked position, wherein the safety pull is structured to be pulled to unlock the channel cover and move the channel cover to the unlocked position.

5. The cable grab of claim 4, wherein the lever is structured to rotate and abut against the channel cover spring when the channel cover spring is unlocked to move the channel cover spring to the unlocked position.

6. The cable grab of claim 1, wherein the lever is structured to rotate independent of the cam across a first range of rotation and is structured to cause the cam to rotate and grab the safety wire across a second range of rotation.

7. The cable grab of claim 6, further comprising:
a lever spring operatively coupled to the lever and structured to bias the lever to the second range of rotation when the cable grab is at rest.

8. The cable grab of claim 6, further comprising:
a cam spring operatively coupled to the cam and structured to bias the cam toward the safety wire.

9. The cable grab of claim 1, wherein the normal webbing portion passes through the lever.

10. The cable grab of claim 1, wherein the connection point is structured to couple a harness via one or more intermediate components.

11. A cable grab for a fall protection system comprises:
a channel for receiving a safety wire;
a channel cover having an unlocked position to provide access to the channel and a locked position to prevent access to the channel;
a safety pull structured to lock the channel cover in the locked position, wherein the safety pull is structured to be pulled to unlock the channel cover and move the channel cover to the unlocked position; and
a lever structured to rotate and abut against the channel cover spring when the channel cover spring is unlocked to move the channel cover spring to the unlocked position.

12. The cable grab of claim 11, further comprising:
a cam structured to grab the safety wire in the event of a fall.

13. The cable grab of claim 12, further comprising:
a lever is structured to rotate independent of the cam across a first range of rotation and is structured to cause the cam to rotate and grab the safety wire across a second range of rotation.

14. The cable grab of claim 13, further comprising:
a lever spring operatively coupled to the lever and structured to bias the lever to the second range of rotation when the cable grab is at rest.

15. The cable grab of claim 13, further comprising:
a cam spring operatively coupled to the cam and structured to bias the cam toward the safety wire.

16. The cable grab of claim 13, further comprising:
an energy absorber having a working length, a normal webbing portion, and a connection point, wherein the working length or the normal webbing portion are structured to engage the lever in the event of a fall.

17. The cable grab of claim 16, wherein the normal webbing portion passes through the lever.

18. A cable grab for a fall protection system comprises:
a channel for receiving a safety wire;
a cam structured to grab the safety wire in the event of a fall;
a lever structured to rotate in a clockwise direction independent of the cam across a first range of rotation and is structured to rotate further in the clockwise direction across a subsequent second range of rotation and cause the cam to rotate and grab the safety wire; and
webbing passing through the lever and configured to attach to a harness, wherein the webbing is structured to cause the lever to rotate in the clockwise direction in the event of a fall.

19. The cable grab of claim 18, when the cable grab is in a first orientation, the clockwise direction of rotation is downward, and when the cable grab is in an inverted second orientation, the clockwise direction is upward.

20. The cable grab of claim 18, further comprising:
a lever spring operatively coupled to the lever and structured to bias the lever in the clockwise direction.

* * * * *